United States Patent [19]

Gonia et al.

[11] 4,306,698
[45] Dec. 22, 1981

[54] CABLE STRESS/STRAIN RELIEF

[75] Inventors: Richard J. Gonia, New Berlin; James R. Spalding, Wauwatosa, both of Wis.

[73] Assignee: General Electric Company, Schenectady, N.Y.

[21] Appl. No.: 197,396

[22] Filed: Oct. 16, 1980

[51] Int. Cl.$^3$ ............................................. F16L 3/08
[52] U.S. Cl. .............................. 248/74 R; 174/153 G
[58] Field of Search .................. 248/74 R, 56, 68 CB; 174/153 G, 31 R; 285/159; 16/2

[56] References Cited

U.S. PATENT DOCUMENTS

| | | | |
|---|---|---|---|
| 844,790 | 2/1907 | Garrett | 248/68 R X |
| 1,835,155 | 12/1931 | Harbert | 248/56 |
| 2,496,402 | 2/1950 | McVeigh et al. | 248/56 UX |
| 2,530,258 | 11/1950 | Marsan | 174/153 G |
| 2,674,470 | 4/1954 | Appleton | 285/159 |
| 3,300,163 | 1/1967 | Randolph | 248/56 |
| 4,114,802 | 9/1978 | Brown | 233/26 |

FOREIGN PATENT DOCUMENTS

| | | | |
|---|---|---|---|
| 93580 | 6/1962 | Denmark | 16/2 |
| 1029932 | 5/1966 | United Kingdom | 174/153 G |

*Primary Examiner*—J. Franklin Foss
*Attorney, Agent, or Firm*—Wheeler, House, Fuller & Hohenfeldt

[57] ABSTRACT

A strain relief device comprises a bushing for being mounted for rotation in a hole in a support member. The bushing has a flange at one end that prevents it from sliding through the hole and it has an axial internally threaded bore. A collet that has an axial bore, and external thread at one end and a tapered or conical portion contiguous with the thread screws into the bushing thread from the side of the support member opposite from the flange on the bushing. As the threaded end of the collet advances it causes the conical portion to wedge in the hole and be pressed radially inwardly for gripping a cable which has been passed through the collet and bushing.

4 Claims, 3 Drawing Figures

CABLE STRESS/STRAIN RELIEF

BACKGROUND OF THE INVENTION

This invention relates to a device before securing a flexible element such as tubing or electrical cable in a manner which prevents strain resulting from an axial stress in the cable from being transmitted from one side of the device to another while permitting strain due to portional stress to be freely transmitted. The new stress/strain relief device is illustrated herein as being used to secure an electrical cable but the term "cable", which is used for the sake of brevity, should be understood to include various elongated flexible elements such as tubing, rope, and the like.

Cables that are secured with known types of stress/strain relief devices where they run into movable equipment or appliances, by movements of the operator. When a cable comprised of an insulating sleeve surrounding plurality of insulated conductors is gripped in a prior art-type of strain relief device and is twisted about it's longitudinal axis near the place where it is gripped, it and the conductors will form a short pitch longitudinally extending helix. This will result in high internal stress being developed in the cable. On the other hand, if a twist through the same rotational angle is applied at a greater distance from the place where the cable is gripped, the helix has a longer pitch and there is a corresponding reduction in internal strain. The term "stress" is used herein as having it's customary meaning which is to indicate the torsional or tensile force applied to a cable and the term "strain" is used to indicate the movement or stretch of the cable which may be caused by the stress or other forces applied to the cable.

Although many devices purporting to relieve or distribute torsional strain in a flexible element have been devised previously, none are perceived to provide for rotation of the flexible element freely about it's longitudinal axis while it is engaged in a strain relief device. The known strain relief devices fix a portion of the flexible element to a stationery support through which the flexible element passes. Consequently, none of the known devices provide for transmitting or relieving stress resulting from torsional or other applied forces.

SUMMARY OF THE INVENTION

An object of the present invention is to provide a simple an inexpensive stress/strain relief device which allows torsion in a cable to be freely transmitted while at the same time prevents longitudinally developed strain from being transmitted through the device.

In general terms, the new device comprises an internally threaded bushing which slips over the cable. The bushing has an external cylindrical portion which is sized to fit with clearance for rotation in a hole in a support member. A collet is slipped over the cable on the side opposite of the hole from the bushing. The collet has an external thread which turns into the internal thread of the bushing. The collet also has a conical portion adjacent to the threaded portion which is slotted longitudinally so that when the collet turns into the bushing it is compressed radially inwardly to effect a gripping force on the cable, thereby providing longitudinal strain relief. When torque is applied to the cable, the bushing and collet rotate together so as to relieve torsional strain.

A detailed description of an embodiment of the new stress/strain relief device will now be described in detail in reference to the drawing.

DESCRIPTION OF A PREFERRED EMBODIMENT

Figure 1:
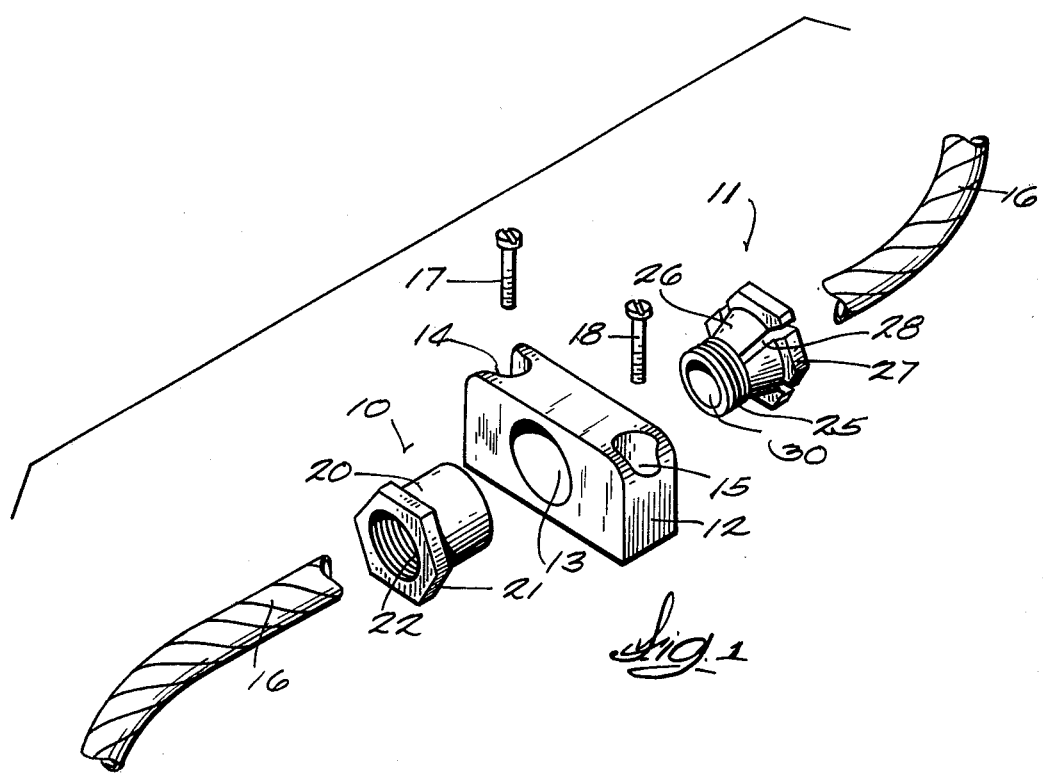
FIG. 1 is an exploded perspective view of the new stress/strain relief device.
Figure 2:
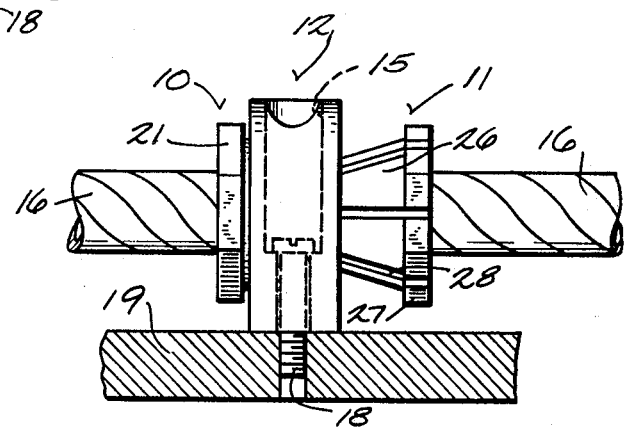
FIG. 2 is a side elevation of the assembled device, containing a cable, and mounted on a support element.

An illustrative embodiment of the new stress/strain relief device is depicted in FIG. 1. It comprises a bushing 10, a collet 11 and a support member 12. The support member has a bore 13 extending through it. The bore constitutes a bearing surface. The support member 12 is illustrated as being a block of metal or plastic which holes 14 and 15 for fastening it on an appliance with screws 17 and 18 but the support member could be any object such as wall through which one desires to pass a cable that is going to be subjected to torsional and tensional stress. Part of an appliance is depicted in FIG. 2 and is marked 19. A cable which is to pass through the device in FIG. 1 is shown with a break in it for the sake of clarity and each part is given the same reference numeral 16 as the uninterrupted cable in the other figures.

Figure 3:
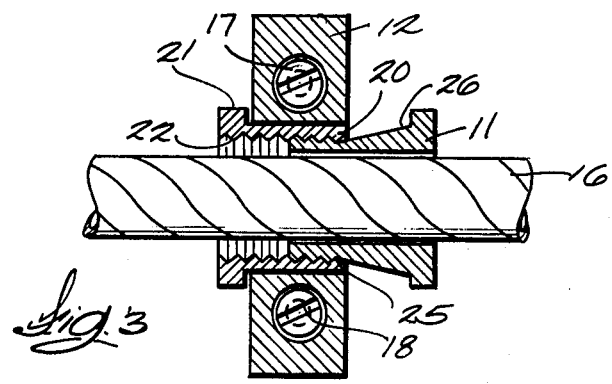
FIG. 3 is a longitudinal section of the device wherein the tapered collet is not yet fully turned into the internally threaded bushing.

As shown in FIGS. 1 and 3, bushing 10 has external cylindrical part 20 on which a flange 21 is formed at one end. The bore of bushing 10 is provided with a thread 22 which extends from end to end. As shown in FIG. 2, the cylindrical part 20 of bushing 10 fits loosely enough into bore 13 of support member 12 to allow for free rotation. Flange 21 is polygonal so it can be engaged with a wrench.

As is clearly evident in FIG. 1, collet 11 comprises an externally threaded cylindrical end 25 that runs up to an integral conical portion 26. The conical portion is terminated at one end with a polygonal flange 27. The conical portion has axially extending slots such as the one marked 28. The slots are cut through flange 27 and conical portion 26 but not through the threaded portion 25. The collet has a straight cylindrical internal bore 30 which extends from end to end. The conical segments which are created by slotting the collet are capable of flexing radially inwardly to apply a gripping force on the cable when the threaded end 25 of the collet is turned into the internal thread 22 of bushing 10 a sufficient distance for the conical portion to cause a wedging action by virtue of it being screwed into the bushing.

FIG. 2 shows the device in a preliminary assembly stage where the cylindrical portion of bushing 10 is fitted into the bore 13 of support member 12 and flange 21 of the bushing is interfacing with a surface of the support member surrounding its bearing bore. The threaded portion 25 of the collet is turned into the internal thread 22 of the bushing but not so far that the wedging action of the conical portion 26 is taking place as yet. Thus, the conical portion is in its expanded state and cable 16 is not yet gripped by the collet.

The final step in assembly of the device is to turn collet 11 and its threaded end 25 further into thread 22 of bushing 10 than it is turned in FIG. 3. This produces the wedging action between the bore of bushing 10 and the tapered or conical part 26 of collect 11 so as to develop a radially inwardly force on the segments of the conical portion which cause them to flex and grip the cable tightly. Now, whenever torsional stress is applied to the cable, the torsional strain which would otherwise be developed is relieved by reason of the cable being allowed to rotate with the bushing which is journaled in the bore 13 of the support. Of course, any longitudinal or tensile stress applied to cable 16 will simply result in slight movement of the collet and bushing assembly until a small axial freeplay is taken up.

The completely assembled device mounted on an appliance 19 with cable installed as depicted in FIG. 3. As is evident, closing of collet 11 down on cable 16 provides the strain relief and the ability of the bushing to move or rotate in response to torsional stress on the cable provides the stress relief required to assure long cable life.

The bushing and collet may be made of plastic, metal or any suitable material. Some styles of the device are made with a brass bushing 10 and a brass collet 11 and the support member 12 is made of aluminum.

The bushing and column may be joined with a snap fitting, adhesive or by welding or other suitable means, none of which are shown.

We claim:

1. A device for coupling a flexible element such as a cable to a support member in a manner that prevents longitudinal strain in said cable from being transmitted from one side of said member to the other and permits torsional strain to be transmitted, comprising:
   a bushing having a cylindrical portion for extending through and for rotation in a hole in said support member, said bushing having a radially extending flange at one end of the cylindrical portion for interfacing with one side of said support member and having an axial bore for said cable to pass through and said bore having an internal thread,
   a collet having an axial bore for said cable to pass through, said collet having an externally threaded end portion for being screwed into the thread in said bushing and having a radially slotted enlarged portion contiguous with said threaded and such that when said collet is screwed into said bushing said enlarged portion is pressed radially inwardly to grip said cable.

2. The device as in claim 1 wherein said enlarged portion of said collet is a generally conical portion that increases in diameter in a direction away from the thread on the collet.

3. The device as in claim 2 wherein the larger diameter part of said conical portion of said collet has an integral radially extending flange.

4. The device as in claim 3 wherein the flanges on the collet and bushing, respectively, are polygonal in shape for enabling them to be engaged with a wrench.

* * * * *